United States Patent [19]
Ryll et al.

[11] Patent Number: 5,784,067
[45] Date of Patent: Jul. 21, 1998

[54] SOFTWARE OBJECT FOR PROVIDING A DISPLAY OF A SCROLLING REAL-TIME GRAPH AND WHICH PROVIDES FOR INSERTION AND UP-DATING OF PLOTS OF REAL TIME DATA INTO THE DISPLAY

[75] Inventors: Patrick B. Ryll, Portsmouth; Neil A. Jackson, North Kingstown; John T. Williamson, Riverside; Francis J. Frantz, Newport, all of R.I.

[73] Assignee: The United States of America as represented by the Secretary of the Navy, Washington, D.C.

[21] Appl. No.: 693,816

[22] Filed: Jul. 22, 1996

[51] Int. Cl.[6] ............................................. G06T 3/00
[52] U.S. Cl. ............................................. 345/440
[58] Field of Search ........................... 345/440, 433–439

[56] References Cited

U.S. PATENT DOCUMENTS 5,483,468  1/1996  Chen et al. ................... 364/551.01

OTHER PUBLICATIONS

"Tk Graph Widset", Concepts, Tcl Interface, C++ Interface http://scorch.doc.ic.ag uk/nmp2/graph/concepts.html, Aug. 1994.

"PDS Users Manual" http://www.dfrc.nana.gov/Facility/Watr/pds.html, May 1995.

Primary Examiner—Almis R. Jankus
Attorney, Agent, or Firm—Michael J. McGowan; William F. Eipert; Prithvi C. Lall

[57] ABSTRACT

A software object for providing a display of a scrolling real-time graph includes a window, a fixed axis within the window, a scrolling axis within the window, axis labels within the window, a plot within the window, and facility for viewing obscured regions of the graph along the scrolling axis.

7 Claims, 3 Drawing Sheets

1

SOFTWARE OBJECT FOR PROVIDING A DISPLAY OF A SCROLLING REAL-TIME GRAPH AND WHICH PROVIDES FOR INSERTION AND UP-DATING OF PLOTS OF REAL TIME DATA INTO THE DISPLAY

STATEMENT OF GOVERNMENT INTEREST

The invention described herein may be manufactured and used by or for the Government of the United States of America for governmental purposes without the payment of royalties thereon or therefor.

BACKGROUND OF THE INVENTION (1) Field of the Invention

The invention relates to computer software and is directed more particularly to software which may be used to insert data plots into window displays and to update the plots, which may be scrolled along one axis.

(2) Description of the Prior Art

There is in the prior art no simple way to add a real time scrolling graph to a software object. To do so, an operator must develop code which draws graphics on a screen each time a display is needed to plot data in real time. This includes layering the graphics upon windows and maintaining control of how the layered graphics are updated. If a plurality of graphs is to be displayed, each graph requires that a unique code be written therefor.

There is thus a need for a software object which can be used for insertion of plots of real time data into a window display, and subsequently can be used easily to update the graph, and which further provides the benefit of ability to view any region of the graph which may be obscured.

SUMMARY OF THE INVENTION

An object of the invention is, therefore, to provide a software object which provides the ability to insert plots of real time data, i.e., a graph into a window display, further provides the ability to easily update the graph, and still further provides the ability to view any region of the graph which may be obscured.

With the above and other objects in view, as will hereinafter appear, a feature of the invention is the provision of a software object for providing a display of a real-time scrolling graph, the object comprising a window, a fixed axis within the window, a scrolling axis within the window, axis labels, a plot, and means for viewing obscured regions of the graph.

The above and other features of the invention will now be more particularly described with reference to the accompanying drawings and pointed out in the claims. It will be understood that the particular software object embodying the invention is shown and described by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
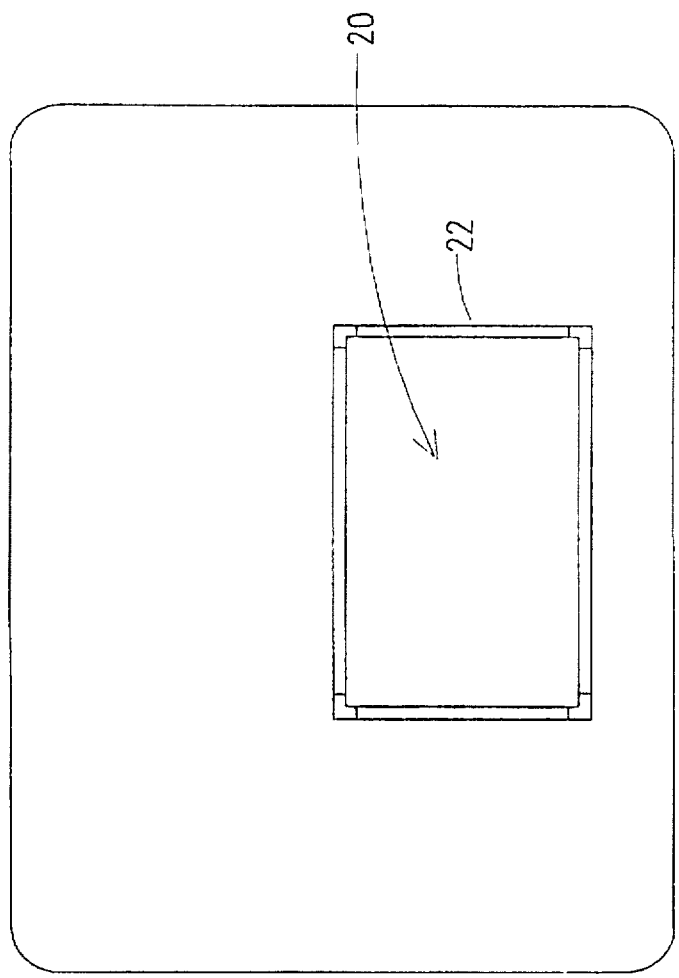
FIG. 1 is a diagrammatic front elevational view of a computer screen having thereon a windowed object illustrative of an embodiment of the invention.
Figure 2:
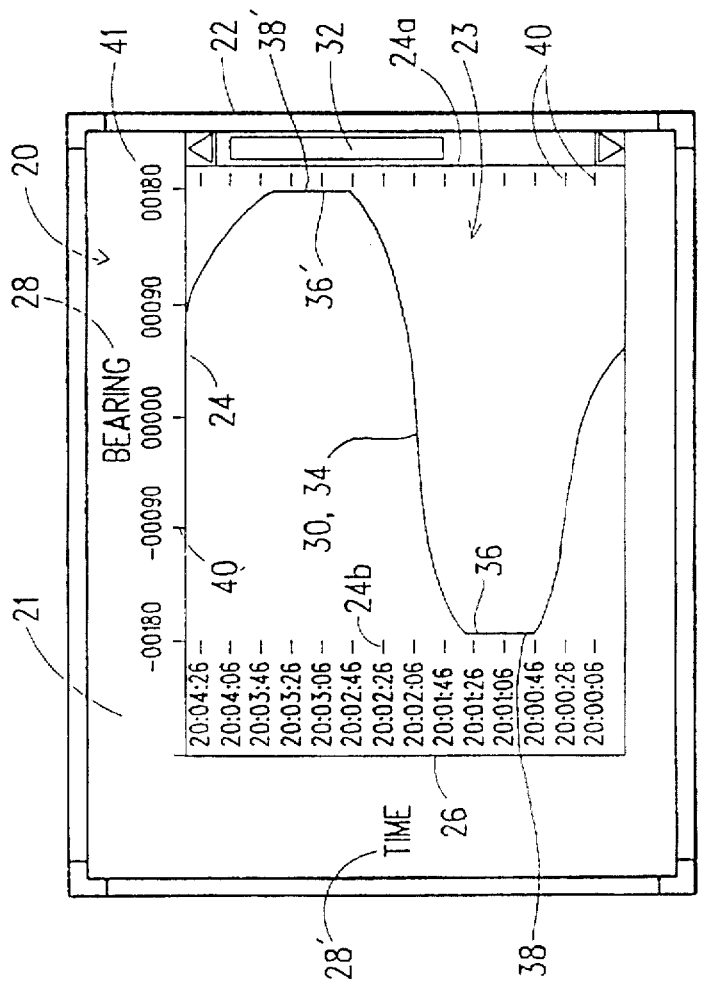
FIG. 2 is an enlarged front elevational view of the windowed object of FIG. 1.

Referring to FIGS. 1 and 2, it will be seen that an illustrative software object 20 for providing a scrollable display 21 of a real-time scrolling graph 23, comprises a window 22, a fixed axis 24 within window 22, a scrolling axis 26 within window 22, axis labels 28, 28', a plot 30, i.e., a curve comprising a series of data points drawn according to specific coordinates, and means for viewing obscured regions of the graph along scrolling axis 26, such as a scroll bar 32. The object 20 can be added to the display 21 by using toolkit intrinsics, the object's classname, and the object's resources.

Once the object 20 is inserted into the display 21, an application 42 (FIG. 3) can update object 20 by using a function which is provided. The function is an interface function for passing data from the application, 42 which is generating or obtaining the data to be graphed, to a scrollgraph widget 48. The application 42, when it has data to be passed to a scrollgraph, calls the interface. The application 42 provides the data points to be graphed, and, the object's name. The interface function formats the data and passes the data to the scrollgraph widget 48.

The fixed axis 24 of object 20 contains static maximum and minimum values 242,246 (FIG. 2). Data points 34 plotted against fixed axis 24 are displayed on graph 23 in a position which is proportional to the length of axis 24 in screen pixels. Data points 38, 38' which fall outside of the minimum and maximum range are drawn along the minimum or maximum edge 36, 36', depending upon to which of the value edges 36, 36' the data points 38, 38' are closer. The resolution of fixed axis 24 is determined by the length of the axis in pixels. Each pixel represents a range of data on fixed axis 24. Inasmuch as the length of fixed axis 24 can be changed dynamically, as by resizing the window 22, the resolution of axis 24 is also dynamic. Such dynamic changes can be initiated by an operator 46 (FIG. 3) instructing size modifications to the object 20. Resizing the window 22 can be initiated by using conventional X-window "commands", such as selecting the window to resize, pointing to a border or corner of the window, and dragging the border or corner until the window 22 arrives at a desired size.

The scrolling axis 26 does not contain static maximum and minimum values, but instead is provided with a floating range of data, with the maximum being the current set of values for axis 26. The minimum value is based on the current value and a range which is provided by the user. The range represents how much history the user wants to store and have displayable on graph 23. Each pixel along axis 26 represents a unit of measurement on axis 26. The quantity of the graph 23 displayed along axis 26 is determined by the size of object 20. Inasmuch as there are instances wherein the entire history is not viewable within the boundaries of the object display 21, scrollbar 32 is used to shift into view obscured regions of graph 23.

The application 42 which is in communication with the scrollgraph widget 48 provides the scrollgraph widget 48 with the maximum number of data points which can be plotted against the scrolling axis 26. The "range" associated with the scrolling axis 26 is thus the maximum number of data points which can be plotted along scrolling axis 26. The scrolling axis 26 continually updates as new data is provided to be plotted with the last data point plotted being the maximum value on this axis. The maximum value is thus the current value. Each pixel along the scrolling axis 26 represents a unit of measurement along this axis. The minimum value on this axis 26 is then the current value less the range.

The maximum value which can be viewed on scrolling axis 26 is the value of the most recent data point sent to the object 20 from application 42. The range indicates the number of data points retained. Only the most recent data points are retained. The data points are retained on a first in, first out basis. The number of data points defining the plot 30 and which are viewed at any given time is dependent upon the size of the window 22, as well as the range of data represented by a pixel.

Tic marks 40, which are used to show distance along each axis 24, 26, are spaced such that tic mark labels 41 do not overlap. The tic marks 40 are spaced by calculating the size, in pixels, of the labels 41 associated with the tic marks 40. The tic marks 40 are then separated by a sufficient number of pixels so that no tic mark labels 41 overlap. The axis labels 28, 28' are automatically centered on their respective axes. Multiple plots (not shown) may be placed on one graph 23, with each plot being of a distinguishable color.

The aforementioned toolkit intrinsics provide an object-oriented framework for creating reusable, configurable, user-interface components, known as "widgets". A widget operates independently of the application, except through prearranged interactions.

Figure 3:
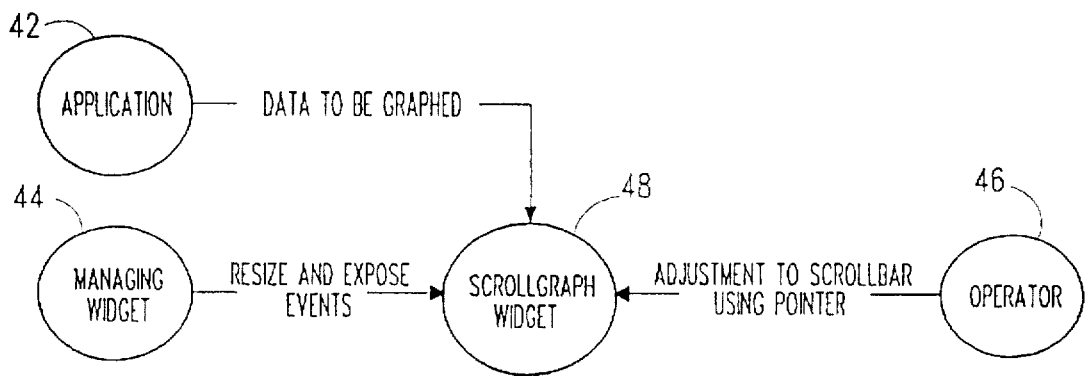
FIG. 3 is an event diagram.

Once a scrolling graph object display, or "scrollgraph", is arranged by application 42, the object 20 responds to various events provided by application 42, a managing widget 44, and the human operator 46 (FIG. 3). The managing widget 44 is a standard widget included within the X-window system. When new data is available to be plotted, application 42 calls the aforementioned function which provides the new data to scrollgraph widget 48. The scrollgraph widget 48 plots the new data 30 and updates the display 21. The parent of the scrollgraph widget 48, i.e., managing widget 44, provides resize and expose events to scrollgraph widget 48. A resize event 50 is generated when managing widget 44 and/or application 42 signals scrollgraph widget 48 to change its size. When one window is obscured by another (not shown), the contents of the obscured area of the obscured window are lost, and must be redrawn when the obscured area later is instructed to become exposed. Such expose events enable the scrollgraph to respond and either resize itself to fit any new geometry restrictions or to redraw any part of its display which has been uncovered by the movement of another window. When operator 46 moves scrollbar 32, such event is provided to scrollgraph widget 48, which responds by drawing the new region to be displayed, that is, scrolling the display along scrolling axis 26.

The scrollgraph widget 48 operates by drawing data to a pixmap (not shown), and then copying the pixmap to display 21. A pixmap is a three-dimensional array of bits. A pixmap is normally thought of as an array of pixels, where each pixel can be a value from 0 to ($2^n-1$), where N is the depth (z-axis) of the pixmap. Applications which use windows are periodically called by a window manager to update the graphics displayed in the application's windows on the screen. A pixmap is used to store the graphics so that they do not have to be regenerated, thus speeding up display of complicated graphics. Usually only windows with detailed graphics will use pixmaps. Since a pixmap is of a fixed length and width, shifting a pixmap by a number of lines will cause data which is shifted out of the pixmap to be lost.

Figures 4, 5, 6:
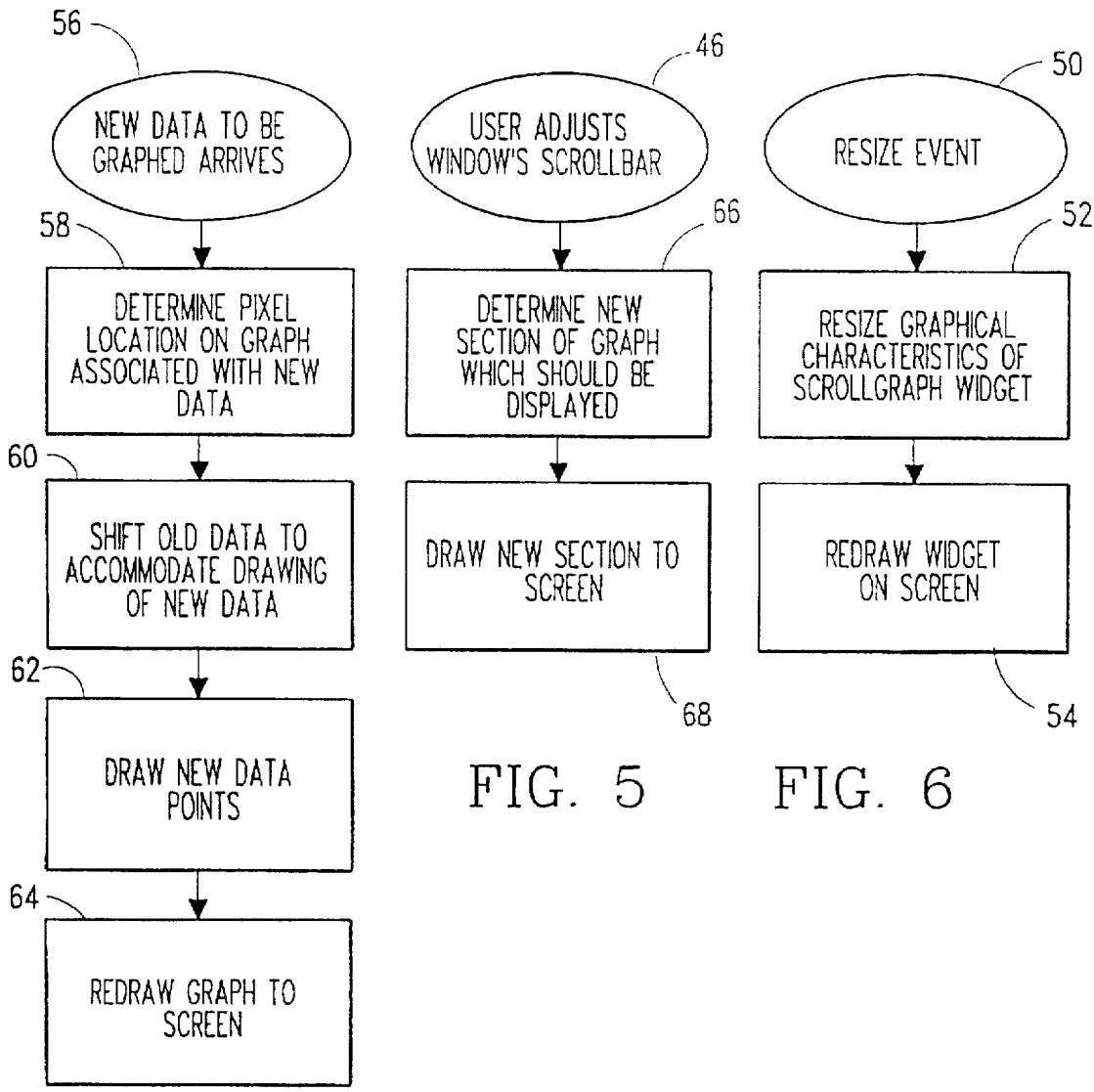
FIG. 4 is a flow chart illustrating steps in applying new data to the object of FIG. 2.
FIG. 5 is a flow chart illustrating steps in scrolling the object of FIG. 2.
FIG. 6 is a flow chart illustrating steps in resizing the object of FIG. 2.

When new data 56 (FIG. 4) is provided to the scrollgraph widget 48, it must display this data in the plot 30 on display 21. The first thing which must be done by the scrollgraph widget 48 is to determine where to draw the new data. The scrollgraph widget 48 determines the number of pixels available between the fixed axis maximum and minimum values 24a, 24b (FIG. 2). Fixed axis 24 contains static maximum and minimum values, 24a, 24b, one at each end of the scrolling axis 26. The minimum value 24b is associated with the minimum point on scrolling axis 26 and the maximum value 24a is associated with the maximum point on the scrolling axis. There is thus a distance in pixels from the minimum static value 24b to the maximum static value 24a when traveling along scrolling axis 26, the distance being the number of pixels between the minimum and maximum static values. The scrollgraph widget 48 then uses this number of pixels and determines the pixel position 58 which corresponds to the data value on fixed axis 24 (FIG. 4).

Each pixel on scrolling axis 26 represents a range of data which is configurable by application 42. The scrollgraph widget 48 determines how many units of change the current data represents from the previous data provided. The scrollgraph widget 48 then converts the units of change to a length in pixels. The current pixmap data is then shifted 60 by the length in pixels, freeing room to draw the new data.

The freed area in the pixmap is filled with the current background color. Any needed tic marks 40 and tic mark labels 41 are then drawn to the pixmap. Then the new data points are drawn 62. Finally, the pixmap is copied 64 to display 21.

When the operator 46 adjusts (FIG. 5) scrollbar 32, an event is generated which determines by how many pixels the scrollbar was moved. The information is provided to scrollgraph widget 48 as to how far, in pixels, the scrollbar has been moved. This distance (i.e., the distance in pixels of movement of the scrollbar 32), is then used to determine 66 the new section of the pixmap to display on the screen. The scrollgraph widget 48 then copies 68 the new section of the pixmap to display 21.

When scrollgraph widget 48 receives a resize event 50 (FIG. 6) it must resize the pixmap. The scrollgraph widget 48 resizes 52 the pixmap by removing the old pixmap from memory and allocating sufficient memory for a pixmap with the new dimensions. Since the pixmap has been resized, data points along the fixed axis 24 must be adjusted to correspond to the new length in pixels of the fixed axis. Once this is done, and the pixmap is redrawn 54, the pixmap is copied to display 21, with attendant axes, tic marks, labels, and the like.

There is thus provided a software object which can be used for insertion of plots of real time data into a windowed graph, and subsequently can be used easily to update the graph, and which further provides the ability to view any region of the plot which may be obscured.

It is to be understood that the present invention is by no means limited to the particular construction herein disclosed and/or shown in the drawings, but also comprises any modifications or equivalents within the scope of the claims.

What is claimed is:

1. A software object for providing a display of a scrolling real-time graph, the object comprising:

a window;

an automatically generated axis graphic comprising tic marks and numeric labels within said window;

an automatically generated and automatically updated scrolling axis graphic comprising tic marks and numeric labels within said window;

a plot within said window;

means in said window for viewing obscured regions of the graph along said scrolling axis, wherein said means for viewing obscured regions of the graph comprise events provided by a selected one of a parent application, a managing widget, and an operator; and a scrollgraph widget;

wherein said patent application is operative to call an interface function which is operative to format new data and to provide the new data from said parent application to said scrollgraph widget, said scrollgraph widget being adapted to plot the new data and automatically update said plot.

2. The object in accordance with claim 1 wherein said scrollgraph widget includes a pixmap comprising a two-dimensional array of pixels, and upon receipt of said new data determines the number of pixels available between minimum and maximum values on said fixed axis, using the number of pixels found available determines pixel positions which correspond to new data value on aid fixed axis, determines how many units of change said new data represents from previous data, and converts said number of units of change to length in pixels, shifts current pixmap data by said length in pixels to free room on said pixmap for said new data, draws said new data on said pixmap, and copies said pixmap onto said display.

3. A software object for providing a display of a scrolling real-time graph, the object comprising:

a window;

a fixed axis within said window;

a scrolling axis within said window;

axis labels within said window;

a plot within said window; and means in said window for viewing obscured regions of the graph along said scrolling axis, wherein said means for viewing obscured regions of the graph comprise events provided by a selected one of an application, a managing widget, and an operator, and wherein said managing widget is the parent of a scrollgraph widget and is adapted to provide resize and expose events to said scrollgraph widget, and said application is adapted to provide resize and expose events to said scrollgraph widget.

4. The object in accordance with claim 3 wherein said scrollgraph widget includes a pixmap comprising a two-dimensional array of pixels and, upon receipt of said resize event resizes said pixmap, adjusts data points along said fixed axis to correspond to a new length of pixels available in said fixed axis, redraws said pixmap, and copies said pixmap to said display.

5. The object in accordance with claim 3 wherein said means for viewing obscured regions of the graph comprise a scrollbar, and said events provided by an operator are occasioned by operator manipulations of said scrollbar, which event is provided to a scrollgraph widget which draws a new region to be displayed in said window.

6. The object in accordance with claim 5 wherein said scrollgraph widget includes a pixmap comprising a two-dimensional array of pixels, and receives information from said scrollbar as to the extent of movement of said scrollbar by the operator, and using said extent of movement determines a new section of said pixmap to display in said window, and copies said new section of said pixmap to said display.

7. The object in accordance with claim 3 wherein said scrollgraph widget includes a pixmap comprising a two-dimensional array of pixels, and upon receipt of said new data determines the number of pixels available between minimum and maximum values on said fixed axis, using the number of pixels found available determines pixel positions which correspond to new data value on said fixed axis, determines how many units of change said new data represents from previous data, and converts said number of units of change to length in pixels, shifts current pixmap data by said length in pixels to free room on said pixmap for said new data, draws said new data on said pixmap, and copies said pixmap onto said display.

* * * * *